(12) United States Patent
Baechle et al.

(10) Patent No.: US 9,828,192 B2
(45) Date of Patent: Nov. 28, 2017

(54) CONVEYING ARRANGEMENT

(71) Applicant: Robert Bosch GmbH, Stuttgart (DE)

(72) Inventors: Andreas Baechle, Rickenbach (DE); Hansruedi Wanner, Gachlingen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/329,080

(22) PCT Filed: Jun. 22, 2015

(86) PCT No.: PCT/EP2015/064003
§ 371 (c)(1),
(2) Date: Jan. 25, 2017

(87) PCT Pub. No.: WO2016/012171
PCT Pub. Date: Jan. 28, 2016

(65) Prior Publication Data
US 2017/0225911 A1 Aug. 10, 2017

(30) Foreign Application Priority Data

Jul. 25, 2014 (DE) .................. 10 2014 214 696
May 26, 2015 (DE) .................. 10 2015 209 618

(51) Int. Cl.
*B65G 47/84* (2006.01)
*B65G 54/02* (2006.01)
*B65G 47/28* (2006.01)

(52) U.S. Cl.
CPC ............ *B65G 54/02* (2013.01); *B65G 47/28* (2013.01)

(58) Field of Classification Search
CPC .... B65G 17/323; B65G 17/20; B65G 47/842; B65G 47/843; B65G 54/02; B65G 23/18
(Continued)

(56) References Cited

U.S. PATENT DOCUMENTS 4,760,294 A * 7/1988 Hansen .................. H01F 5/003
310/13
5,749,453 A * 5/1998 Doornekamp .......... B65B 23/06
198/377.03
(Continued)

FOREIGN PATENT DOCUMENTS

DE 29620915 3/1998
DE 102011075445 11/2012
(Continued)

OTHER PUBLICATIONS

International Search Report for Application No. PCT/EP2015/064003 dated Sep. 18, 2015 (English Translation, 2 pages).

*Primary Examiner* — James R Bidwell
(74) *Attorney, Agent, or Firm* — Michael Best & Friedrich LLP

(57) ABSTRACT

An arrangement for transferring and/or grouping products (32) is proposed, comprising at least one mover (20) which has at least one permanent magnet (19) which is connected to the mover (20), wherein the permanent magnet (19) interacts with at least one coil plane (18) of a drive surface (13) for the in particular contactless driving of the mover (20), wherein the mover (20) is arranged displaceably and/or rotatably in at least two degrees of freedom on the drive surface (13), furthermore comprising at least one conveying system (34, 38) which conveys products (32), characterized in that the mover (20) picks up or deposits at least one product (32) by means of a movement of the mover (20) with at least one vertical component.

19 Claims, 6 Drawing Sheets

(58) Field of Classification Search
USPC .... 198/680, 867.04, 803.4, 432, 426, 468.5, 198/805, 619, 472.1, 468.6
See application file for complete search history.

(56) References Cited

U.S. PATENT DOCUMENTS

| | | | | |
|---|---|---|---|---|
| 6,109,419 | A * | 8/2000 | Spatafora | B65G 47/848 198/377.04 |
| 6,876,107 | B2 * | 4/2005 | Jacobs | B60L 15/38 310/12.19 |
| 7,134,258 | B2 * | 11/2006 | Kalany | B65B 35/24 198/460.1 |
| 7,752,828 | B2 * | 7/2010 | Gudim | B65B 5/068 198/803.11 |
| 9,079,724 | B2 * | 7/2015 | van de Loecht | B65G 47/841 |
| 9,394,114 | B2 * | 7/2016 | Hanisch | B65G 54/02 |

FOREIGN PATENT DOCUMENTS

| | | |
|---|---|---|
| DE | 102011085724 | 5/2013 |
| EP | 2411307 | 6/2012 |
| EP | 2589966 | 5/2013 |
| WO | 2013059934 | 5/2013 |
| WO | 2013098202 | 7/2013 |

\* cited by examiner

CONVEYING ARRANGEMENT

BACKGROUND OF THE INVENTION

The invention is based on a transporting device.

Transporting systems in which the transporting bodies (so-called movers) are mounted in an electromagnetic field in an almost friction-free manner are known. The electromagnetic forces that can be regulated are used both to drive the transporting bodies as well as for an electromagnetic linear bearing arrangement or levitation over a flat, electrically excited transporting surface (also described as an X-Y stator). A system of this type is described in WO 2013/059934 A1.

EP 2441307 B1 already discloses a device and a method for transporting products by means of grippers. The device comprises a linear motor having conveyed items that are guided in a displaceable manner on a guiding arrangement with a gripping arm so as to intermittently receive products, wherein the guiding arrangement is embodied as a linear guiding section. The conveyed items can be displaced forwards and backwards so as to receive and deposit products on the guiding section, wherein in the case of products that are supplied in the conveying direction of the feeder belt one behind the other in a line, the feeder belt, the discharging belt and the guiding section are arranged adjacent to one another in a parallel manner at least in a lateral overlapping region. In the case of products that are supplied in rows adjacent to one another using the conveying power of the feeder belt, the feeder belt is arranged perpendicular to the discharging belt and the discharging belt and the guiding section are arranged parallel to one another and are arranged with the feeder belt adjacent to one another at least in a lateral overlapping region.

A device in accordance with the generic type or a method in accordance with the generic type for grouping articles or containers is also disclosed in DE 102011085724 A1.

The object of the invention is to further increase the flexibility of the device.

The method in accordance with the invention in contrast comprises the advantage that the flexibility is further increased. This occurs in accordance with the invention by virtue of the fact that the mover receives and/or deposits at least one product by means of a movement of the mover with at least one vertical component. In particular during a movement of the mover with at least one vertical component, the products that in general are supplied in a horizontal manner can be raised in an upwards direction from a transporting system and/or can be deposited onto the transporting system or in a container that is moved by the transporting system, whether the transporting system is at a standstill or moving. The preferably vertically arranged drive surface thereby does not influence the transporting path of the transporting system. This arrangement in particular renders it possible for the mover to also receive in the desired manner products that are supplied in an unorganized manner and to group said products in a flexible manner. In addition, it is possible to adjust the format almost at the push of a button so that it is possible to provide individually tailored packing steps or processing steps for each product. It is possible by means of using a so-called planar drive to predetermine the receiving and depositing paths of the mover that is conveying the product. It is possible to perform an individual adjustment for product flows or containers by means of a mover that can be controlled individually. It is also possible for the product to be handled only once along different processing steps so that further interfaces relating to product handling can be omitted. The described concept contributes to mechanical standardization since the same transporting system can be used for different processing steps. System components that have been used previously can be omitted, which contributes to the reduction in expenditure. The transporting system is no longer dependent upon individual guiding arrangements or similar. The speed of the mover can also be individually controlled and thus adjusted to desired movement paths of the further transporting systems. As a consequence, it is also possible to optimize the speed of the transport. In addition, it is possible owing to the flexibility of the mover similarly to use different transporting types such as by way of example continuous or intermittent transporting movements. In the case of an arrangement of the transporting system in line with the feeder belt or discharging belt/container transport, it is possible to continuously receive or discharge the product in the flow.

In addition, the transporting device that is used is characterized by means of a hygienic construction in which in an expedient further development it is possible to revert back to a vertical drive surface that features a design that is open in a downwards direction. As a consequence, it is easier to clean this arrangement. In addition, it is possible to achieve a gap-free embodiment of the drive surface which additionally facilitates cleaning.

In an expedient embodiment, it is provided that the mover receives at least one product from a container and/or deposits said product in a container. As a consequence, further processing steps are performed in a flexible manner, namely loading and unloading a container.

In an expedient further development, it is provided that the mover deposits at least one product on the transporting system and/or receives at least one product from the transporting system. It is possible in a particularly simple manner for products that are supplied in an unorganized manner to be transported in specific groups and/or rows and thus to be organized.

In an expedient further development, it is provided that the mover moves at a similar speed and/or at a different speed to that of the product so as to receive the product. As a consequence, it is possible to achieve a particularly careful handling of the product since damaging impacts or similar can be avoided. The same is also achieved by virtue of the fact that the mover moves at a similar speed and/or different speed to that of the container or the transporting system so as to deposit the product. It is thereby possible to synchronize the mover with the transporting system in the case of different transporting types such as intermittent or continuous. It is therefore possible to handle the product in a similar manner whether the transporting system is operating continuously or is at a standstill.

In an expedient further development, multiple movers are provided that receive multiple products from the supplying system and in each case are brought into a specific position for grouping purposes and in said grouping position the products are in each case in a defined position with respect to one another. It is thereby possible for the mover in a desired manner to group the products, by way of example in rows or columns one behind the other or similar arrangements.

In an expedient further development, it is provided that multiple movers in each case deposit at least one product in the container, preferably simultaneously. As a consequence, the output of the system is increased. It is possible by means of depositing an entire layer to prevent individual products in the container or on the band being displaced.

In an expedient further development, it is provided that the mover grips the product and alters the orientation of said product. The mover can thereby arrange the products in a desired manner, by way of example in rows and/or in specific groups on the same transporting system that also supplies the products. Products that are supplied in an unorganized manner are thereby organized in a simple manner. As a consequence, it is possible to transfer organized products accurately to further transporting systems in the desired manner with specific consideration paid to the subsequent processing steps.

In an expedient further development, it is provided that the mover comprises at least one handling device for receiving at least one product. A corresponding handling device can be aligned to the respective form of the product so as to handle or grip the product in a particularly careful manner. For this purpose, it is particularly expedient that the handling device comprises at least one gripper and/or at least one opening that is suitable for applying a negative pressure, preferably a vacuum, to the product. This ensures the safe transport of a product.

In an expedient further development, at least two movers are provided that cooperate so as to receive at least one product. As a result of two movers cooperating for the handling of one product, it is possible to omit a specific format adjustment since it is necessary merely to change the relative spacing of the movers with respect to one another in the case of different product sizes.

In an expedient further development, it is provided that the drive surface is arranged above the plane of the transporting system, in particular in a transverse manner with respect to the transporting direction of the transporting system. As a result, the drive surface does not block the further transporting system.

In an expedient further development, multiple transporting systems are provided that are arranged preferably one above the other. Owing to the possibility of moving the mover with at least one vertical component, it is possible to supply products depending upon the subsequent working steps of different transporting systems. As a consequence, the flexibility of the arrangement is increased.

In an expedient further development, at least one product identification device or sensor is provided in the region of the transporting system, preferably outside the drive surface. As a consequence, it is possible in a particularly simple manner to identify the position of the products that are to be moved. This is advantageous particularly in the case of products that are supplied in an unorganized manner. In addition, it is also possible to use the position identification device for other purposes such as by way of example controlling the quality of the products and said device would consequently already be present.

Furthermore, it is feasible that the transporting system is not only embodied from a planar drive surface in the form of a plane or plate, but rather by way of example from a prism having an oval base surface on whose peripheral surfaces the movers travel in a concentric manner. This facilitates the return of the mover to the receiving/output position. It is feasible that by way of example the front side is used to receive the product while the products are output on the rear side. The flexibility is clearly increased by means of choosing a planar drive.

In one expedient further development, it is provided that the mover travels to a specific position in dependence upon the product identification device or the sensor, in order to move the product that is identified or sensed. In connection by way of example with the speed of the transporting system, a controller determines the position the mover is to travel to so that the product can thereby be reliably moved into the desired position. The operational reliability and accuracy of the device are thereby increased.

In one expedient further development, it is provided that at least one mover receives and/or deposits at least two products. As a consequence, the output speed of the entire system can be increased by means of receiving and/or depositing the products in multiple rows.

Further expedient developments are evident in the further dependent claims and the description.

BRIEF DESCRIPTION OF THE DRAWINGS

Exemplary embodiments of the device in accordance with the invention are illustrated in the drawings and are further explained hereinunder.

In the drawings.

DETAILED DESCRIPTION

Figure 1:
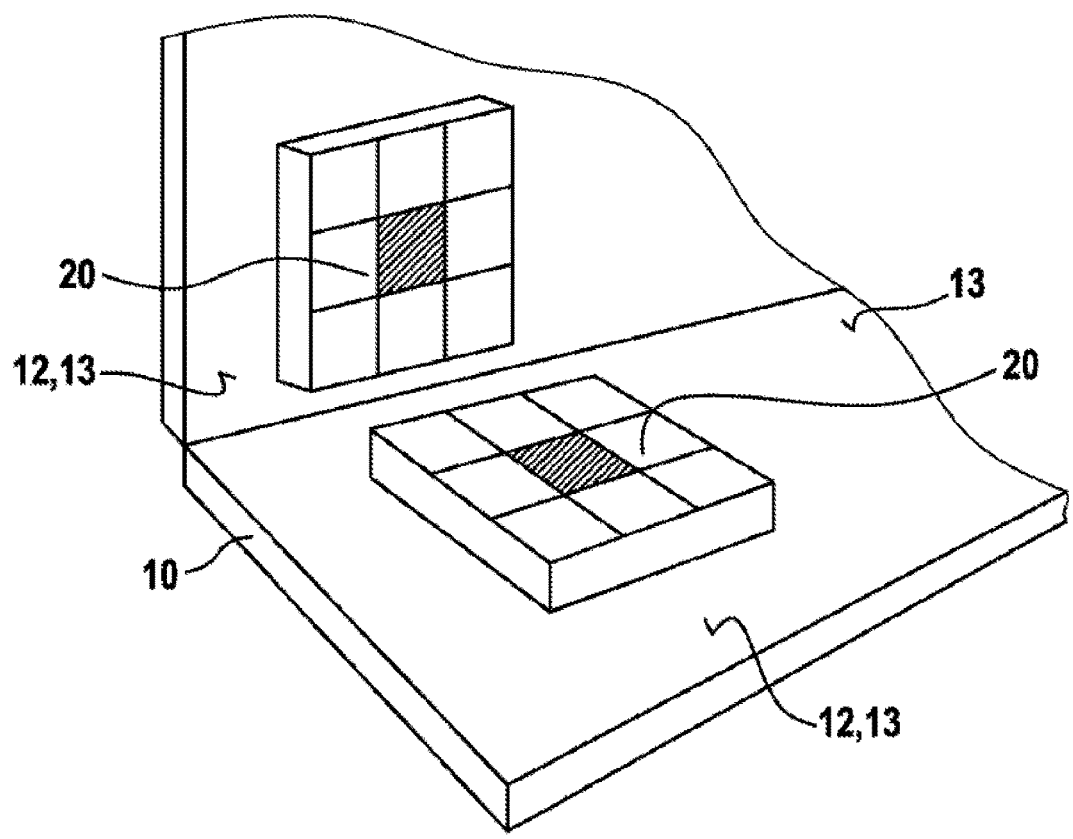
FIG. 1 illustrates a perspective view of a mover module having drive surfaces that are oriented differently.

In accordance with FIG. 1, the base platform 10 comprises a carrier plate 12 or a drive surface 13 and at least one mover 20 is arranged on said drive surface. The mover 20 is generally a passive mover 20 that preferably comprises permanent magnets 19 that cooperate with coils on the carrier plate 12 or drive surfaces 13 so as to generate a relative movement. Alternatively, the mover 20 could however also be operated in an active manner in that the mover 20 comprises at least one coil stack for supplying voltage, said coil stack cooperating with means (permanent magnets, coils) that a generate magnetic field on the carrier plate 12 or drive surface 13 for generating a relative movement in a suitable manner. FIG. 1 illustrates in an exemplary manner the first carrier plate 12 or drive surface 13 that is embodied as a horizontal plane, and also a further carrier plate 12 or drive surface 13 that adjoins said horizontal plane and is embodied as a vertical plane. The two movers 20 that are arranged on said vertical plane are likewise embodied in a planar manner and cooperate with the respective drive surfaces 13 in such a manner that a movement of the mover 20, said movement preferably occurring in a contactless manner, is possible relative to the drive surface 13 both in the plane of the drive surfaces 13 in at least two degrees of freedom as well as optionally a rotational movement about the normal of the drive surface 13.

Figure 2:
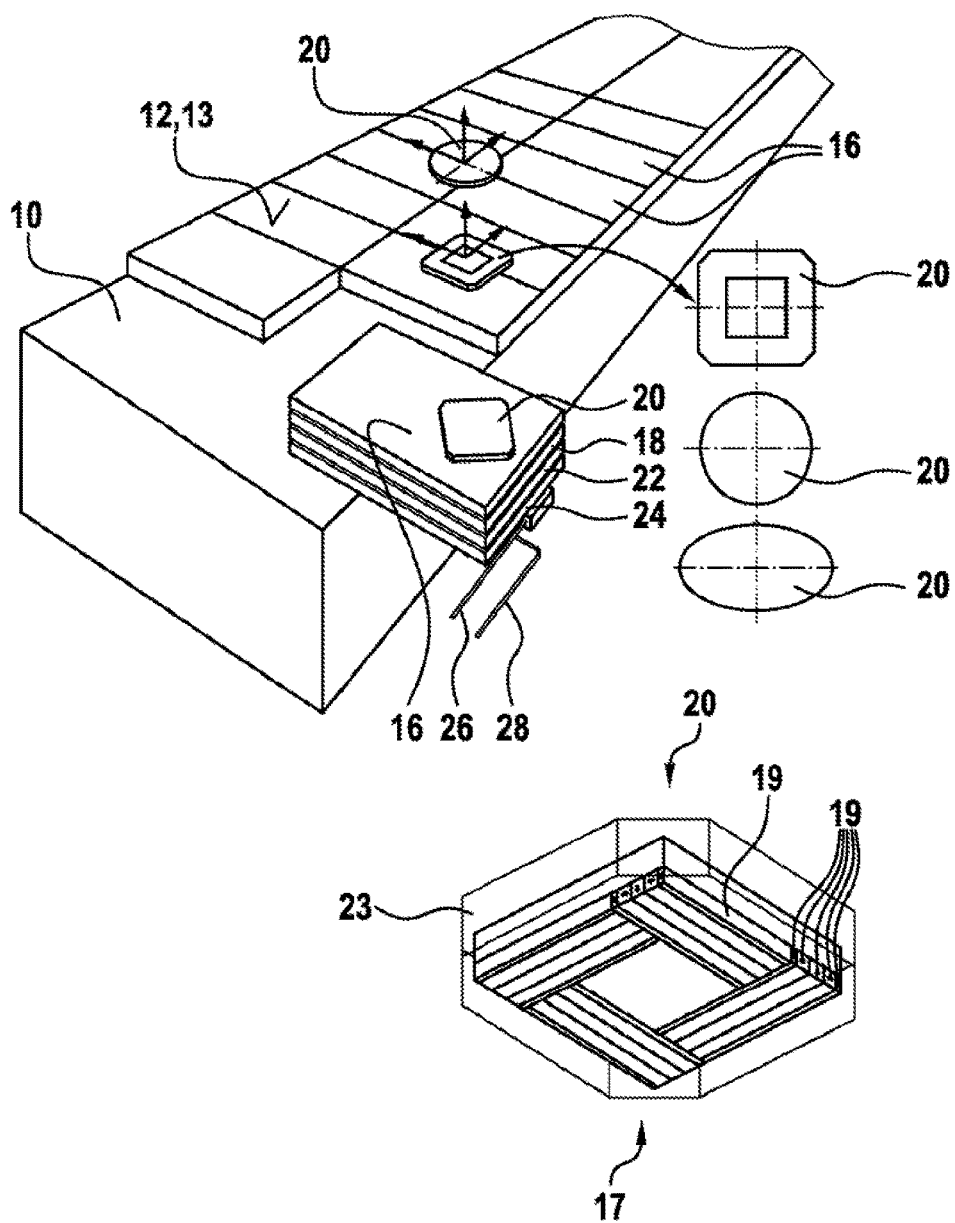
FIG. 2 illustrates a perspective view of the device.

In the case of the exemplary embodiment in accordance with FIG. 2, two movers 20 are illustrated in an exemplary manner having different base forms, namely an essentially rectangular mover 20 or a round mover 20. An oval embodiment or an embodiment in a different shape would also be feasible. The carrier plate 12 or drive surface 13 is embodied from multiple individual parts or tiles 16. The tiles 16 are embodied as square-shaped or rectangular. The tiles 16 comprise an essentially planar surface and are constructed in layers. The tile 16 is embodied as quadratic or square. The tile 16 thus comprises a coil plane 18, a sensor plane 22 and also a power electronics plane 24. Furthermore, a bus system 26 is provided that connects the tiles 16 to a central computer or processor (not illustrated). In addition, a voltage supply 28 is provided with associated connectors by way of which the power electronics system plane 24 or the coil plane 18 and/or the sensor plane 22 can be supplied with energy.

The base platform 10 describes the base element. The required embodiment possibilities of the system are possible as a result of said base element. The term "base platform 10" is understood to mean the system carrier or a machine frame. Said base platform must comprise the required rigidity. The base platform 10 can already receive control components and a power electronic system. Optionally, the carrier plate 12 or drive surface 13 could also be components of the base platform 10. The base platform 10 offers the base or the element for arranging further function units. The base platform 10 is furthermore the basis or the element for arranging further transporting systems. The base platform 10 is to be compatible with other base platforms. On the surface of the base platform 10, the movers 20 that can move relative to the drive surface 13 are arranged on said drive surface. For this purpose, the drive surface 13 or the carrier plate 12 generate a drive force that acts upon the mover 20 and sets said mover into the desired movement. The stationary drive surface 13 is preferably embodied in a planar manner. The mover 20 is controlled in such a manner that said mover can be displaced and/or rotated at least in two degrees of freedom. It is thereby possible to travel to different stations in a flexible manner as described in particular hereinunder if the drive surface 13 connects said mover and stations to one another in a suitable manner.

The mover 20 describes the movable element of the device. On the one hand, the mover 20 is used to generate a relative movement with respect to the carrier plate 12 or drive surface 13. Furthermore, an interaction occurs between the movers 20 or between the mover components. Furthermore, the mover 20 generates a force on the carrier plate 12 or drive surface 13. For this purpose, the mover 20 comprises at least one means for generating a magnetic field, in particular at least one magnet, preferably a permanent magnet 19 that cooperates with a coil 18 of the carrier plate 12, said coil generating a travelling magnetic field, or the drive surface 13 so as to generate movement. An air gap is embodied between the carrier plate 12 or the drive surface 13 and the mover 20 so that a movement of the mover 20 can occur in a contactless manner relative to the drive surface 13. Furthermore, the mover 20 can comprise means for identifying a position.

In one view of FIG. 2, the mover 20 is illustrated in a perspective view. An underside 17 of the mover 20 cooperates with the carrier plate 12 or drive surface 13. Multiple permanent magnets 19 are arranged on the underside 17 of the mover 20. The permanent magnets 19 that are arranged adjacent to the magnetic fields are different. The underside 17 essentially comprises four fields having in each case multiple permanent magnets 19. The center region of the underside 17 does not comprise permanent magnets 19. WO 2013/059934 A1 discloses further alternative embodiments that are drawn upon in the disclosure of the present application. The mover 20 is surrounded by a collision protection 23, which is advantageous in the case of a plurality of movers 20 that are moved.

The carrier plate 12 or drive surface 13 illustrates a multi-layered component in accordance with FIG. 2. Said carrier plate or drive surface comprises the following basic functionalities. On the one hand, said carrier plate or drive surface comprises means for generating a relative movement with respect to the mover 20. In addition, a force is generated that acts upon the mover 20. In addition, said carrier plate comprises means for generating distances (air gaps) between the carrier plate 12 and the mover 20. In addition, the carrier plate 12 comprises means for identifying positions and means for transferring information.

Figure 3:
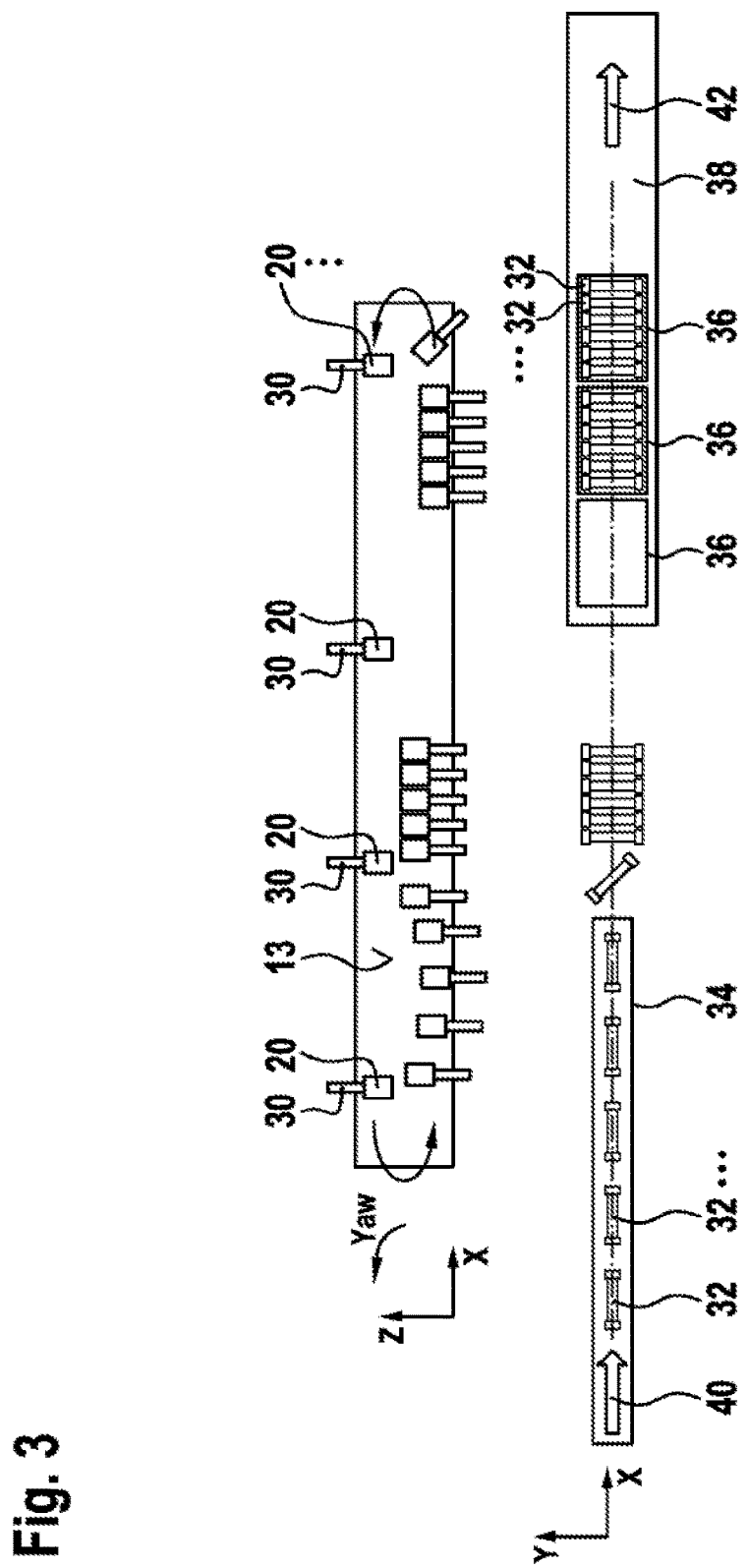
FIG. 3 illustrates a schematic sketch of a continuous product receiving/discharging arrangement.

In the case of the exemplary embodiment in accordance with FIG. 3, a plan view of a transporting system 34 is illustrated, said transporting system conveying products 32 in the transporting direction 40. The products 32 are embodied by way of example as rectangular. Their longitudinal side extends parallel to the transporting direction 40 in the direction X. The transporting system 34 extends in its transporting surface in the X-Y plane. The drive surface 13 extends in the X-Z plane, is in other words illustrated in the side view. The transporting system 34 could thus by way of example be arranged in a horizontal manner, while the drive surface 13 is arranged vertically. A plurality of movers 20 that are located on the drive surface 13, said movers being able to move freely within the drive surface 13 with at least one vertical component as described hereinunder. The mover 20 comprises at least one handling device 30. The handling device 30 is used to receive and/or move and/or deposit the product 32. For this purpose, the handling device 30 could be embodied as a gripper or with a surface for generating a negative pressure in order to achieve a positive locking and/or non-positive locking contact with the product 32. The drive surface 13 is arranged relative to the transporting system 34 in such a manner that the movers 20 can receive products 32 that are supplied by the transporting system 34. It is indicated that a mover 20 receives the product 32, changes its orientation and also groups the products 32 together with further movers 20. The term "to group" is understood to mean arranging multiple products 32 directly adjacent to one another and thus combining them in a group. A group of this type is subsequently deposited in the container 36. Generally, for this purpose the products 32 are oriented in such a manner that their longitudinal sides come to lie adjacent to one another.

Furthermore, a further transporting system 38 is provided. Multiple containers 36 are located on said transporting system 38. The movers 20 now fill these containers 36 with the grouped products 32. For this purpose, the movers 20 move along the drive surface 13 at the same speed with which the container 36 is moved by the transporting system 38 and deposit the received products 32 in the container 36.

Figure 4:
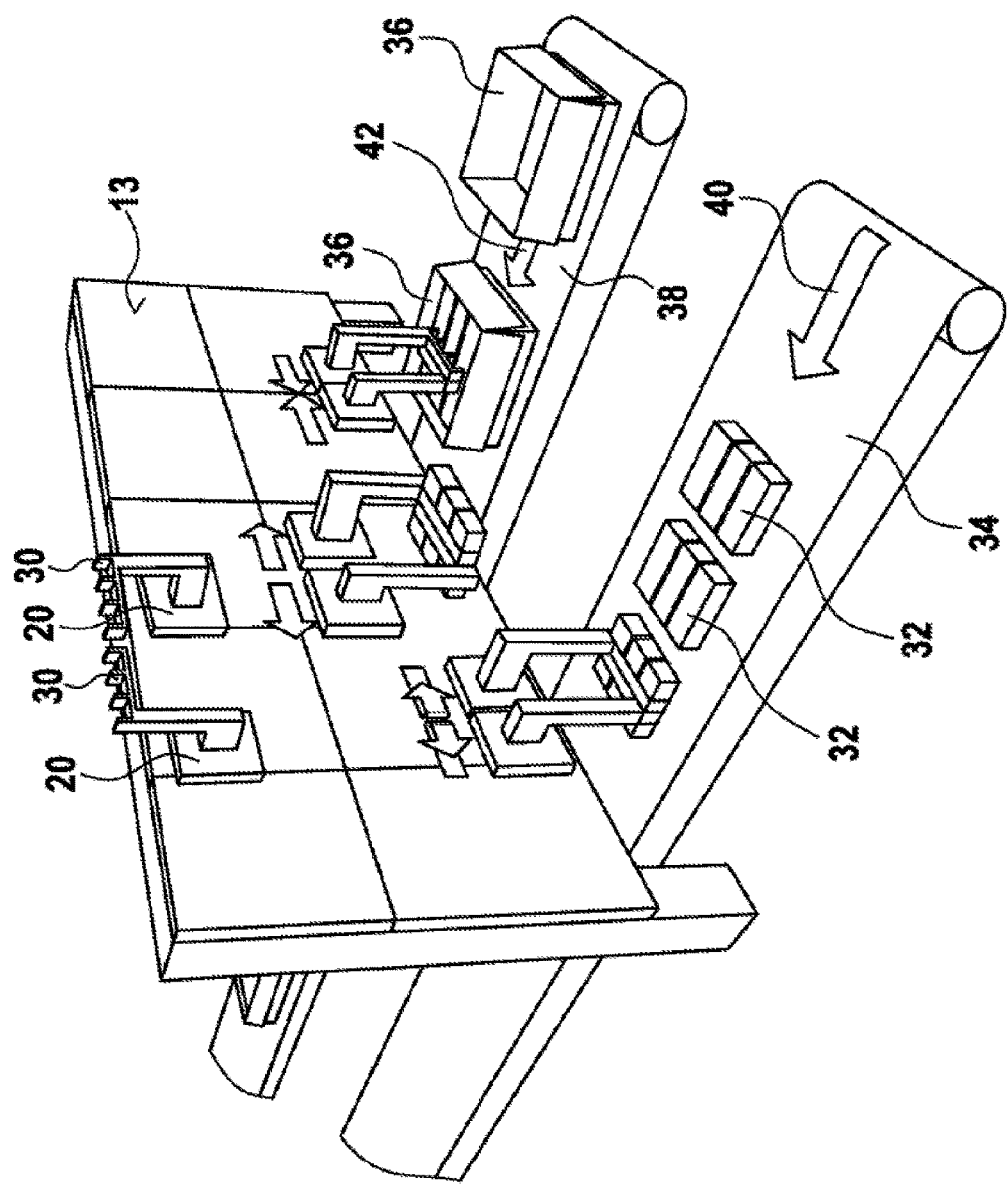
FIG. 4 illustrates a perspective view with parallel transporting systems.

In the case of the exemplary embodiment in accordance with FIG. 4, a perspective view is selected. The two transporting systems 34, 38 are arranged parallel to one another with parallel transporting directions 40, 42, preferably in the horizontal plane. The drive surface 13 covers the two transporting systems 34, 38 transverse with respect to their transporting direction 40, 42. The drive surface 13 is arranged slightly above the upper surface of the transporting systems 34, 38 in such a manner that the movers 20 are in the position to receive products 32 that are supplied with at least in part vertical movement and to deposit said products in the container 36. Containers 36 that are filled are guided by means of the further transporting system 38 below the drive surface 13 to possible further processing stations.

It is illustrated in an exemplary manner that two movers 20 together in each case grip or receive a group of products 32 that are supplied, transport said products to the further transporting system 38 and deposit said products in the container 36 that is supplied at that location. The handling device 30 is by way of example embodied in an L-shape and comprises at least one, preferably however multiple receiving arrangements of products 32.

Figure 5:
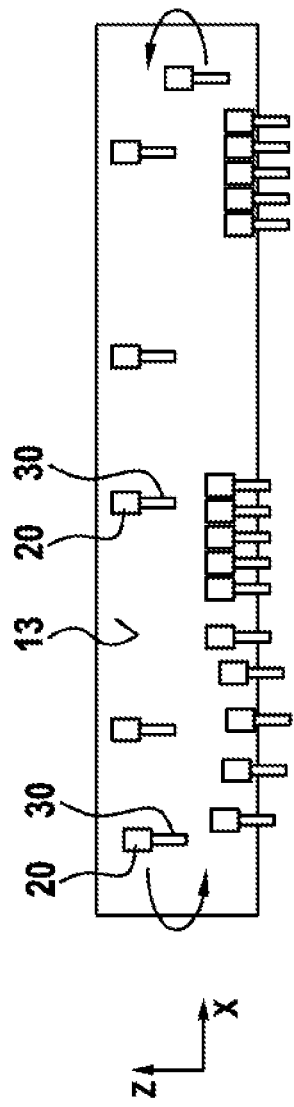
FIG. 5 illustrates a schematic sketch of the mover returning without a change in orientation.
Figure 6:
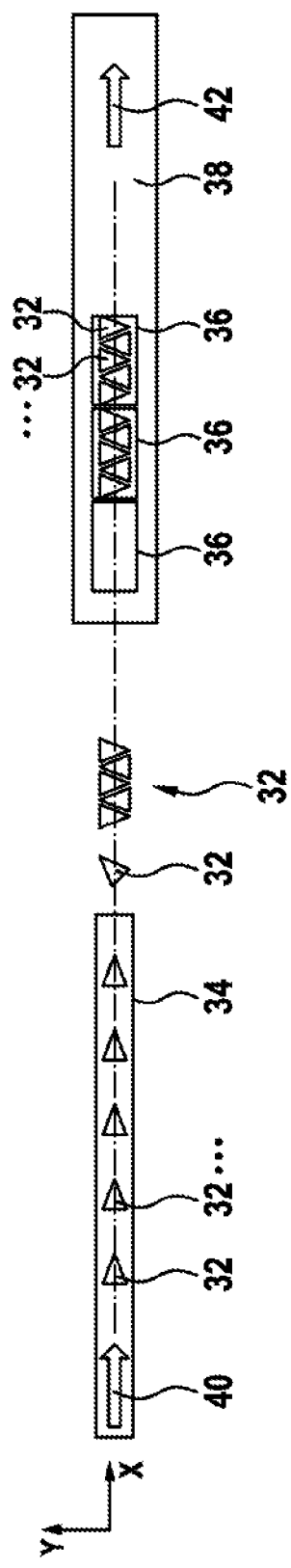
FIG. 6 illustrates a schematic sketch with regard to different product orientations.

In the case of the exemplary embodiment in accordance with FIG. 6, by way of example triangular products 32 are supplied. The movers 20 receive in each case a product 32 with an at least in part vertical movement and orient this product in each case in an alternating manner in a transverse manner with respect to the transporting direction 40, one time with the point forwards, one time with the point towards the rear. The products 32 that are grouped in this manner are received by the movers 20 and transported into the container 36 that is provided by the transporting system 38. The movers 20 are transported in the upper region of the drive surface 13 from the discharging position as is illustrated at the bottom on the right-hand side, into the removal position as is illustrated at the bottom on the left hand side. The handling device 30 is always oriented downwards towards the products 32 as is illustrated in an exemplary manner in FIG. 5.

Figure 7:
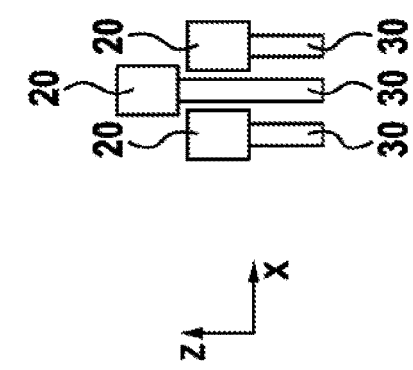
FIG. 7 illustrates an offset arrangement of different movers and FIG. 8 illustrates a schematic sketch of the multiple row deposit of products in a container.

In the case of the exemplary embodiment in accordance with FIG. 7, the movers 20 are in each case arranged in the direction Z offset with respect to one another. As a consequence, it is possible that the handling devices 30 can comprise a small spacing in the direction X with respect to one another. As a consequence, it is possible to achieve small product groupings. For this purpose, however, the length of the handling devices 30 is to be adjusted in such a manner that it is possible for them to receive products in the same plane.

Figure 8:
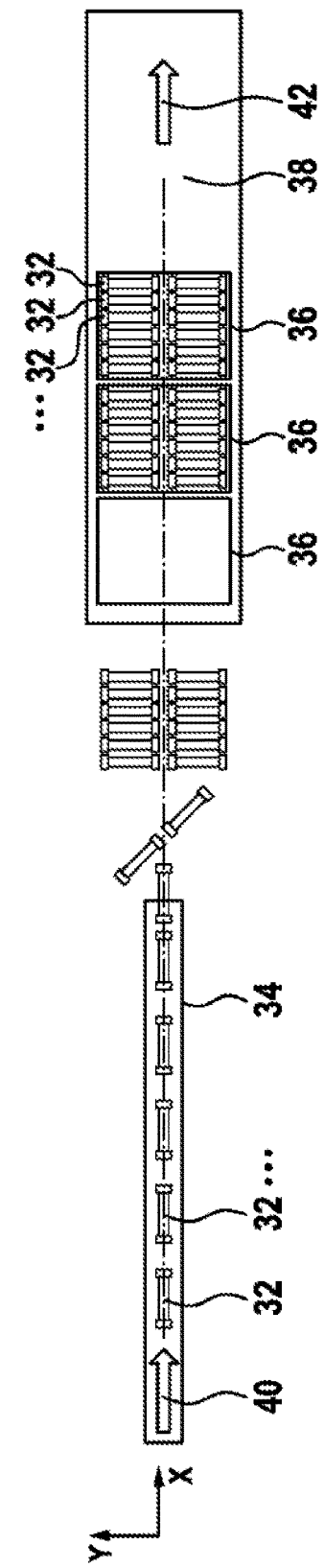

In the case of the exemplary embodiment in accordance with FIG. 8, the width of the further transporting system 38 is embodied in such a manner that larger containers 36 can be transported, and it is thereby possible to sort the products 32 into multiple rows, in particular two rows in one container 36. A mover 20 can receive one or multiple products 32 and then rotate where appropriate.

The described device works as follows. One or multiple feeder systems or transporting systems 34 such as by way of example conveyor belts can supply packed or unpacked products 32. These feeder belts can be supplied in an arbitrary angle with respect to the drive surface 13 of the planar drive that comprises at least one drive surface 13 and mover 20. Parallel arrangements are preferred for higher speeds in order to render tracking possible. Alternatively, 90° arrangements are also preferred for so-called assortment feeds. Likewise, the transporting systems 34, 38 can also be arranged in multiple or various planes. Typically, the drive surface 13 is arranged in a perpendicular manner and the transporting systems 34, 38 are arranged in a horizontal manner. The discharging systems, in other words in the exemplary embodiments the transporting system 38, which are used to discharge the products 32 or the containers 36 into which the products 32 that are to be discharged have been sorted, can be embodied in a similar manner as the feeder systems or transporting systems 34 that are described above.

The device for transporting and/or grouping products 32 from the transporting system 34, preferably a feeder belt, into at least one container 36 or directly onto the transporting system 38, preferably a conveying device within a packaging machine fulfills various functions. The main functions are embodied as follows.

Products 32 are received by the transporting system 34, the feeder system, into a transferring device, namely the planar drive comprising at least the drive surface 13 and the mover 20. In the case of so-called inline applications, the products 32 are preferably received with a more adjusted speed in the direction X (corresponding to the transferring direction). In order to render it possible to receive products, a superposed movement in the direction Z (corresponding to the perpendicular) is performed, in other words a movement with at least one vertical component. The product 32 is held for example by means of a vacuum on the mover 20. In the case of a 90° application, the product 32 is preferably received when the system is at a standstill and then raised in the direction Z prior to being moved further in the direction X.

During the subsequent movement, the products 32 can be handled by the movers 20 in an arbitrary manner. By way of example, products 32 can be rotated about the Z axis and/or grouped. Likewise, it is also feasible for products to pass or to be supplied to other processing stations during the transporting procedure. In the case of a device for filling the container 36, a group can correspond to a layer of products 32 in the container 36. The grouping occurs by means of delaying the preceding products 32 of a group or by means of accelerating the subsequent products 32 of a group.

In order to form the groups when loading containers 36, a group of products 32 can be accelerated. A gap with respect to the subsequent group thus occurs.

When depositing the products 32, various variants are possible. In the case of continuously transferring products, the groups that are formed or the respective individual product are adjusted to the speed of the container 36 or of the transporting system 38, preferably the deposit belt. When loading containers 36, it is preferred that all products 32 of the same group are laid in the container 36 simultaneously. A superposed movement in the direction X and Z is necessary for this purpose. In the case of more than one product layer being provided in a container 36, the movement in the direction Z is shortened for each further layer in each case by the height of the product. Alternatively, it is possible to deposit the products 32 when the system is at a standstill. For this purpose, individual products 32 or product groups are deposited. The products 32 do not necessarily have to be deposited in a container 36 but rather can be grouped in a chain or deposited directly on a belt, in other words directly on the transporting system 38. This could be used by way of example as a means for feeding products for a tubular bag machine.

For further optimization, it is possible for the trajectories of the products 32 to be selected in such a manner that the required distances for transferring the products 32 can be minimized. The trajectory optimization is dependent upon the arrangement of the products 32 on the transporting system 34, the product dimensions and also the arrangement of the containers 36. The movers 20 do not necessarily have to receive and/or deposit the products 32 at a specific location but rather can receive said products by way of example later and/or deposit said products earlier and thus shorten or optimize the path between the receiving point and depositing point.

Not all functions are required in each case. The rotation of the products 32 is by way of example only necessary if the orientation of the products 32 on the transporting system 34, in particular on the feeder belt, deviates from those in the containers 36.

The container 36 refers to any type of product holder. By way of example, a preformed carton or blister that is used as packaging for the products 32. It is however also feasible to loosely group and stack products 32 on a conveyor belt without containers 36. It is likewise also feasible that not only loading functions but rather also unloading functions or also reloading functions of a container 36 in another container 36 can be achieved with this system. In one possible product arrangement, the product 32 moves in the longitudinal direction on the transporting system 34, on a belt, is received, rotated during the movement, and, grouped in a changed arrangement, is deposited in a container 36.

An alternative arrangement could provide a possibility of receiving products from multiple product feeders or transporting systems 34 by way of example in multiple planes. These feeder belts are arranged by way of example one below the other so that the site at which the product 32 is received only differs in the direction X and in the direction Z but not in the direction Y.

Further arrangements are also feasible. The products 32 can also be deposited in containers 36 or on transporting systems 34, 38, preferably belts, on various transporting planes. The arrangement of the transporting systems 34, 38 is similar to a mirrored variant of multiple feeder belts. The function can also be reversed, in other words the products 32 are taken from a container 36 and deposited on a transporting system 34, or placed onto a belt or into a chain. Alterations/manipulations to the product 32 can be performed on the way from the receiving position to the depositing position. Alterations to equipment that is reliant on a synchronized product movement are particularly interesting. This could be for example a marking or an impression on the product 32 by means of a printer, by way of example a laser printer.

In the case of the exemplary embodiment in accordance with FIG. 3, the planar drive is arranged in a vertical manner. The drive surface 13 thus drives passive magnetic elements, namely the movers 20. Independent movements are possible for each mover 20 on the planar drive or the drive surface 13. The movements in the direction X overlap with a movement in the direction Z, in other words a vertical component for receiving the product and depositing the product. It is preferred that movers 20 are rotated for the return journey 180° about the Y axis in order to minimize the construction height of the drive surface 13. The trajectories are optimized to the effect that the system length is minimized. The movers 20 can be moved in the return run to a storage function in the event of a backlog in order to be able to use various formats or product performances independent of the number of movers 20 that are found in the system. A sensor ascertains the precise positioning of the products 32 on the transporting system 34, by way of example on the feeder belt. This renders it possible by virtue of corrective movements of the mover 20 to compensate for any empty divisions or deviations in position in the case of a continuous product supply.

In the case of one embodiment variant having products that are received and deposited intermittently, the products 32 are gripped or deposited when the system is at a standstill. An arrangement of the transporting systems 34 that are to be supplied is possible at an arbitrary angle. A grouping function is also feasible so that the product supply and the product discharge are formed from the same transporting medium, by way of example a belt. A gripping possibility can occur by means of a relative movement of two movers 20 (possible in the continuous operation). Likewise, a rotational movement is feasible about a Z axis with corresponding kinematics. There is the possibility of correcting the grip of the mover 20 in the Y direction. In addition, the most varied combination possibilities can be achieved from continuously/intermittently receiving or continuously/intermittently placing products 32, by way of example continuously receiving products 32 in line in the flow and placing or depositing at a standstill. Multiple different receiving points and depositing points are also feasible in order by way of example to perform so-called assortment packaging or sorting procedures or organizing procedures.

In the case of the embodiment variant in accordance with FIG. 5, the movers 20 can be returned without changing their orientation. A rotation about the Y axis is therefore not performed. It is also possible to return the mover 20 with conventional conveying means or transporting systems 34, 38, by way of example belts, chains or toothed belts. As a consequence, it is possible to achieve a cost reduction by means of a smaller drive surface 13. A movement in the direction Y can be used for the purpose of switching a vacuum on or off or in order to rotate the products 32. The Y movement can consequently be used as an actuator. In addition, the movements could be used in the direction Y (or also in the direction Z) in order to perform a selective manipulation of individual products 32. For example, the direction of rotation could be performed in dependence upon the Y position, in other words products 32 can be rotated differently and accordingly deposited as sorted depending upon which rotating gate is being travelled to. It is not necessary to embody the planar drive in a rectangular manner, but rather said planar drive must comprise the range of motion of the mover 20. Products 32 can be received by multiple transporting systems 34, 38 by way of example feeder belts. These are arranged offset in the direction Z. The products 32 can be deposited in containers 36 on various transporting planes. The movers 20 can be arranged offset with respect to one another in the direction Z. The products can thus be grouped with a spacing smaller than the width of the mover. Each mover 20 receives two or more products 32 in order to form by means of rotation rows.

The device is a component of a flexible transporting system for different transporting applications, in particular in packaging technology of by way of example pharmaceuticals or foodstuffs. The use is however not limited to this.

The invention claimed is:

1. A device for transferring and/or grouping products (32), comprising at least one mover (20) that comprises at least one permanent magnet (19) that cooperates with at least one coil plane (18) of a drive surface (13) so as to drive the mover (20), wherein the mover (20) is arranged in such a manner that the mover can be displaced and/or rotated on the drive surface (13) in at least two degrees of freedom, furthermore comprising at least one transporting system (34, 38) that transports products (32), characterized in that the mover (20) receives and/or deposits at least one product (32) by moving the mover (20) with at least one vertical component while the mover (20) supports the at least one product (32) vertically above the at least one transporting system (34, 38).

2. The device as claimed in claim 1, characterized in that the drive surface (13) is arranged vertically.

3. The device as claimed in claim 1, characterized in that the mover (20) receives at least one product (32) from a container (36) and/or deposits at least one product in a container (36).

4. The device as claimed in claim 1, characterized in that the mover (20) deposits at least one product (32) on the transporting system (34, 38) and/or receives at least one product from the transporting system (34, 38).

5. The device as claimed in claim 1, characterized in that the mover (20) moves at a speed similar to that of the product (32) so as to receive the product (32).

6. The device as claimed in claim 1, characterized in that the mover (20) moves at a similar speed and/or a different speed to that of the container (36) or the transporting system (34, 38) so as to deposit the product (32).

7. The device as claimed in claim 1, characterized in that multiple movers (20) are provided that receive multiple products (32) from the feeder system (34) and in each case are brought into a specific position for grouping purposes and in said position the products (32) are located in each case in a defined layer with respect to one another.

8. The device as claimed in claim 1, characterized in that multiple movers (20) deposit in each case at least one product (32) in the container (36).

9. The device as claimed in claim 1, characterized in that the mover (20) grips the product (32) and changes the orientation of said product.

10. The device as claimed in claim 1, characterized in that the mover (20) comprises at least one handling device (30) for receiving at least one product (32).

11. The device as claimed in claim 10, characterized in that the handling device (30) comprises at least one gripper and/or at least one opening for applying a negative pressure to the product (32).

12. The device as claimed in claim 1, characterized in that at least two movers (20) are provided that cooperate so as to receive at least one product (32).

13. The device as claimed in claim 1 characterized in that at least one transporting system (38) is provided for transporting at least one container (36).

14. The device as claimed in claim 1, characterized in that the drive surface (13) is arranged above a plane of the transporting system (34, 38).

15. The device as claimed in claim 1, characterized in that the at least one mover (20) receives and/or deposits at least two products (32).

16. The device as claimed in claim 1, characterized in that the permanent magnet (19) cooperates with the coil plane (18) of the drive surface (13) so as to drive the mover (20) in a contactless manner.

17. The device as claimed in claim 1, characterized in that multiple movers (20) deposit in each case at least one product (32) in the container (36) simultaneously.

18. The device as claimed in claim 10, characterized in that the handling device (30) comprises at least one gripper and/or at least one opening for applying a vacuum to the product (32).

19. The device as claimed in claim 1, characterized in that the drive surface (13) is arranged above a plane of the transporting system (34, 38), in a transverse manner with respect to the transporting direction of the transporting system (34, 38).

* * * * *